United States Patent [19]
Husted

[11] 3,900,229
[45] Aug. 19, 1975

[54] BRAKE CONTROL VALVE INCLUDING FAILSAFE MEANS FOR MANUALLY PUMPING BRAKES OF A VEHICLE

[76] Inventor: Royce H. Husted, 711 Lakeside Dr., Wheaton, Ill. 60187

[22] Filed: May 14, 1974

[21] Appl. No.: 469,631

Related U.S. Application Data

[63] Continuation-in-part of Ser. No. 327,761, Jan. 29, 1973, Pat. No. 3,827,765.

[52] U.S. Cl. .................................. 303/52; 60/550
[51] Int. Cl.² .................................... B60T 15/06
[58] Field of Search .......... 303/52, 54, 50, 53, 6 R; 188/152, 354, 16; 60/553, 550, 582

[56] References Cited
UNITED STATES PATENTS

| | | | |
|---|---|---|---|
| 3,327,479 | 6/1967 | Harness et al. | 60/550 |
| 3,431,029 | 3/1969 | Boueill | 303/53 X |
| 3,827,765 | 8/1974 | Husted | 303/52 |

Primary Examiner—Trygve M. Blix
Assistant Examiner—Douglas C. Butler
Attorney, Agent, or Firm—Samuel Shiber

[57] ABSTRACT

A brake valve for generating a pressure output in response to an operator's force input, by utilizing hydraulic power, or by utilizing the operator's force input when the hydraulic power is insufficient.

7 Claims, 2 Drawing Figures

PATENTED AUG 19 1975 3,900,229

BRAKE CONTROL VALVE INCLUDING FAILSAFE MEANS FOR MANUALLY PUMPING BRAKES OF A VEHICLE

CROSS-REFERENCES TO RELATED APPLICATIONS

This application cross-reference to related applications is a Continuation In Part of my co-pending application titled "Brake Valve" Ser. No. 327,761 filed on Jan. 29, 1973 now U.S. Pat. No. 3,827,765.

BACKGROUND OF THE INVENTION

The present invention relates to a brake valve for generating a pressure output in response to an operator's force input, normally by utilizing hydraulic power, or by utilizing the operator's force input when the hydraulic power is insufficient.

An object of the present invention is to provide a simple and reliable brake valve of the open center type which responds smoothly and accurately to an operator's force input with a corresponding pressure output. Another object is to provide with this brake valve adequate volumetric delivery during power-off operation. These and other objects of the present invention will become apparent during the discussion of the embodiment of the present invention.

SUMMARY OF THE INVENTION

A brake valve according to the present invention for power or manual operation of a brake includes a housing defining a pressure chamber having a fluid inlet including a check valve and a pressure output port, and an actuator means associated with the housing for accepting an operator's force input, the housing including a moveable wall which is moveable for collapsing the chamber and a variable orifice bypassing the moveable wall. A flow passage is provided through the brake valve starting at the inlet and passing into the chamber and exiting the chamber through the variable orifice. A reaction piston is connected with the actuator and moveable relative to and engageable with the moveable wall for selectively restricting and closing the variable orifice and then shifting the moveable wall so that, during power-on operation, the force input causes restriction of the variable orifice and the flow through the flow passage which in turn increases pressure at the pressure output port. During power-off operation, the force input causes closing of the variable orifice and a movement of the moveable wall for collapsing the chamber and manually pumping the pressurized fluid through said output port.

The brake valve actuator comprises a shaft slideably extending through one end of the housing opposite from the moveable wall and also through the moveable wall, the flow passage including a passageway through the moveable wall, and the reaction piston being connected with said shaft. In another aspect, a spring disposed between the reaction piston and the shaft is provided for yieldably biasing the reaction piston upon actuation of the shaft.

The housing thus described contains an open center type hydraulic system to generate a control pressure of a value corresponding to the pulling force exerted by the operator on a brake pedal connected to the shaft. The brake valve shown belongs to the "single fluid" family of brake valves, i.e., these valves discharge output pressure through the same fluid medium by which they receive servo power, which is in this case in the form of forced fluid flow passing through the valve.

This brake valve is further characterized by normally operating in a "full power" mode, i.e., the valve uses the operator's force input only as a signal, but not to perform the actual work of applying the hydraulically actuated foundation brakes which are connected to it. However, during power-off operation the brake valve automatically switches to a hydrostatic manual mode of operation in which it translates the operator's force input into pressurized fluid output.

Structurally, this brake valve is characterized as a "pull type" valve which is commonly used on off road vehicles, in contrast to the "push type" brake valve which is common in the automotive field. With this pull type design, while additional high pressure sealing is required, the shaft is supported in a preferred manner without the need to elongate the unit for providing such bearing support.

DESCRIPTION OF THE FIGURES

Figure 1:
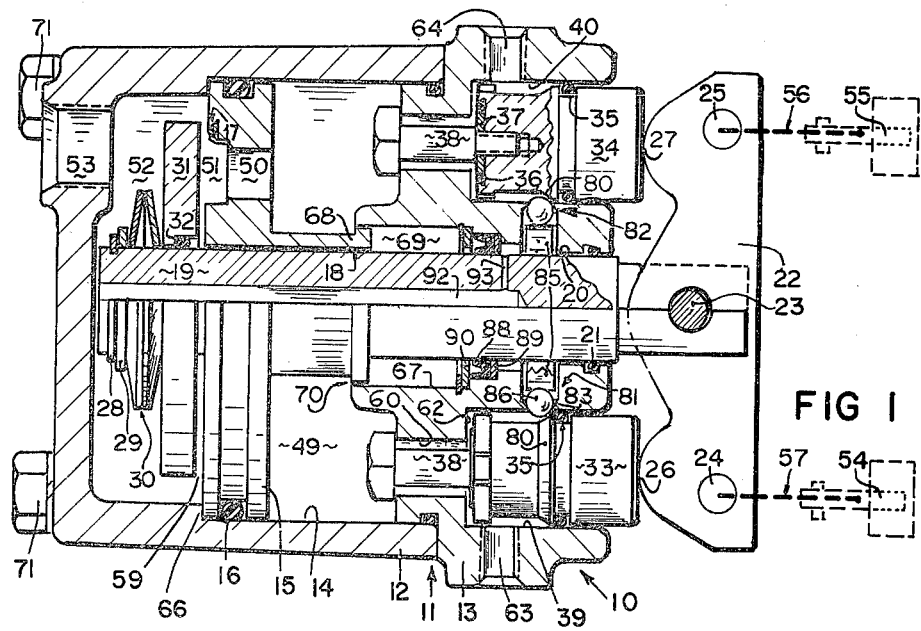
FIG. 1 shows a top sectional view of a brake valve according to the present invention, and, FIG. 2 show a side partially sectional view of the brake valve.
Figure 2:
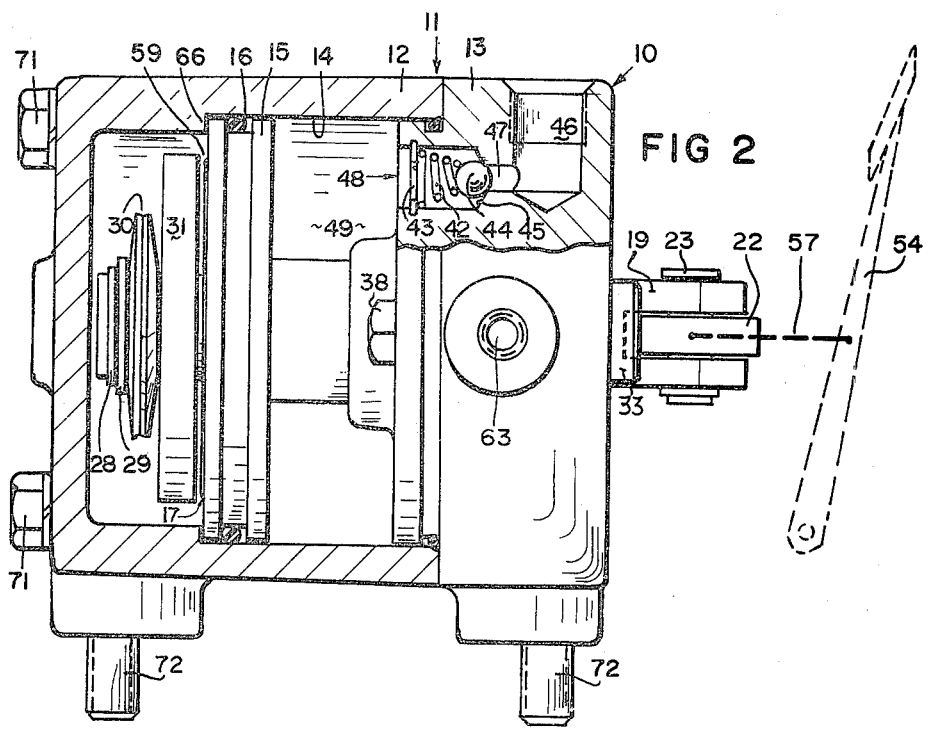

Reference will now be made to the embodiment shown in FIGS. 1 and 2, in which a brake valve 10 is used for generating a right pressure output through a right pressure output port 63, and/or a left pressure output through a left pressure output port 64, in response to a right and/or a left force input, respectively.

The valve 10, in this embodiment, includes a yoke 22 having right and left force input points 24 and 25 respectively, and a right and a left force output points 26 and 27, respectively. The yoke 22 is pivotably connected to a first end of a shaft 19 by a pin 23. The second end of the shaft 19 is disposed in a housing 11 of the brake valve 10, which housing 11 is made of a front section 13 and a rear section 12, secured one to the other by bolts 71, and equipped with mounting bolts 72.

Means are provided in this embodiment for generating a control pressure in a collapsible chamber 49 corresponding in its value to the force exerted by the yoke 22 through the pin 23 on the shaft 19.

A right valve assembly 33 is disposed in a bore 39, and includes a seal 35 and a face seal 36 which is held by a washer 37 secured by a bolt 38; the bolt also prevents the valve 33 from exiting the bore 39 beyond a permitted travel, and is designed not to block communication between the chamber 49 and a bore 60. The function of the valve 33 is to block the control pressure prevailing in the chamber 49 from the right pressure output port 63 by the abutment of the face seal 36 against a surface 62 in response to a force exerted on it by the yoke 22 through the right force output point 26. Similarly, a left valve assembly 34 is disposed in a bore 40 is identical to the right valve assembly 33, and is adapted to block the control pressure from the left output port in response to a force exerted on it by the yoke 22 through the left force output point.

The yoke 22 is adapted to exert a force on the shaft 19 through the pin 23 in response to a force applied at its right and/or left force input points 24 and 25, respectively, by an operator through a right pedal 54 and a right pull-rod 57 and/or a left pedal 55 and a left pull-rod 56, respectively. In addition, the yoke 22 is adapted to exert force on the right valve assembly 33 in response to the force that it receives at the right force input point 24 being substantially smaller than the force that it receives at the left force input point 25. In similar manner the yoke 22 exerts a force on the left valve assembly 34 when the relationship between the two forces at the force input points 24 and 25 is reversed.

Right and left venting assemblies 81 and 82, respectively, are used to prevent a pressure from prevailing in the right or in the left pressure output ports 63 or 64, respectively, while the particular port is being blocked from the chamber 49 as previously discussed. The venting assembly 81 comprises a ball 86 which is urged against a conical seat 83 by a toroidal flat wavey spring 85 common to both venting assemblies 81 and 82. When the valve 33 is pushed forward by the yoke 22 to block communication between the chamber 49 and the port 63, a shoulder 80 formed on it mechanically unseats the ball 86 and opens communication between the port 63 and the vented chamber 52 through passages 92 and 93 formed in the shaft 19. The passage 93 is restrictive enough to enable the brake valve 10 to build pressure in either port 63 or 64 even while the venting means are accidentally open, but is large enough to assure the venting of either port when its respective valve 33 or 34 blocks it from the chamber 49.

The collapsible chamber 49 is defined within the bore 14 by a stationary end-wall provided by the front section 13 of the housing and by a moveable wall. The moveable wall consists of an annular piston 15 carrying a seal 16 and a face seal 17, and by a reaction piston 31 attached to the shaft's 19 second end. Normally, the annular piston 15 rests against a shoulder 66 formed in the bore 14, and the reaction piston 15 is spaced away from it, leaving between the two pistons a circumferential variable orifice 59. This orifice 59, if unfolded, would have a rectangular shape with a base dimension equalling roughly the circumference of the seal 17, for example several inches, and a much smaller height dimension equalling the distance between the seal 17 and the reaction piston 31, for example, a small fraction of an inch. Thus, it takes a small movement of the reaction piston 31 towards the annular piston 15 in order to narrow and to change the character of the variable orifice 59 from practically unrestrictive to highly restrictive. This is desirable in view of the fact that during the initial fill-up period of the foundation brakes (the foundation brakes are the recipients of the pressure output from ports 63 and 64 adapted to translate these pressures to braking torque, and are not shown) a substantial part of the flow entering the brake valve is diverted to accomplish this fillup, and therefore does not pass the variable orifice 59; but an instant later, all the flow has to resume passage through the orifice 59. Accordingly, the reaction piston 31 has to initially over advance towards the annular piston 15, and an instant later to partially retreat. In view of this discussion of the transient process of filling-up the foundation brakes it is understandable that the above discussed design of the circumferential variable orifice 59 is important in order to minimize the retreat of the reaction piston 31 which is obviously a fraction of the normal distance between the two pistons 15 and 31, and therefore, according to the example of this embodiment will be a fraction of a fraction of an inch. Minimizing this retreat is important to the commercial acceptance of the brake valve, since this retreat is transmitted to the operator's foot as an undesireable "kick-back." On the brake system side this kick-back appears as an equally undesireable pressure and torque spike. In addition to minimizing the length of the retreat a resilient spring 30 minimizes the kick-back that the retreat creats. In addition, the spring 30, which comprises a pair of Belleville spring washers backed by a washer 29 and a snap ring 28, provides additional travel at the brake pedal which may be desireable for improving operator's "feel" at the brake pedal.

To dampen the movement of the moveable wall, or specifically the movement of the annular piston 15 relative to the housing 11, a damper is provided in the form of an annular damper chamber 69 defined between a bore 67 and around the saft 19, by a seal 88 which is held by washers 89 and 90, and by a sleeve extension of the annular piston 68. The damper controls the movement of the annular piston 15 that may occur due to a sudden force application at the force input points 24 and/or 25, especially if the fill-up transient in a particular brake system is relatively long. The damper characteristics can be changed by changing a gap 70 between the sleeve 68 and the bore 67 through which the bulk of the fluid contained in the chamber 69 has to exit through, while the annular piston 15 advances in the bore 14.

Normally, during power-on operation, sufficient fluid flow enters the inlet 46, passes the check valve 48 into the chamber 49, continues through holes 50, through orifice 59, into chamber 52 and eventually through an outlet 53. More specifically, fluid flow from an external source such as a hydraulic pump (not shown) enters the inlet 46, continues through a passage 47 and enters the chamber 49 through a check-valve 48.

In response to a force applied at the force input points 24 and/or 25, the yoke 22 will pull the shaft 19 and the reaction piston 31, restricting the flow through the variable orifice 59 to a point that the control pressure in the chamber 49 will be large enough to exert a balancing force on the reaction piston 31 to counter the pull exerted by the yoke 22. If the forces at both force input points 24 and 25 are equal, these forces will mutually balance one another; however if one of these forces is substantially smaller, the yoke 22 at its side will exert a force output on the respective valve assembly 33 or 34, whichever, blocking the respective pressure output port 63 or 64 from the chamber 49.

If, by reason of hydraulic pump failure or for any other reason, the fluid flow that is forced into the inlet 46 is insufficient to actuate the brakes, the brake valve 10 will, in accordance with the invention, shift to a power-off mode of operation. In this mode the reaction piston 31 will first engage the annular piston 15, closing the variable orifice 59 and sealing the chamber 49 by means of the seal 17. The piston 31 will then continue to move with the piston 15 in unison, pulling it away from the step 66 against which it normally rests, toward the end-wall, thereby decreasing the volume of the chamber 49 and thus manually pumping pressurized fluid through the ports 63 and/or 64 to the foundation brakes. At the same time the check valve 48 prevents an up stream flow from the chamber 49 to the inlet port 46.

Some structural details that may be noted are: a bearing 20 formed in the front section of the housing 13 and an adjacent seal 21, and a bearing 18 formed in the reaction piston 31.

While the invention has been illustrated by a single embodiment it is understood that modifications and substitutions can be made by one skilled in the art without departing from the spirit of the invention or the scope of the claims.

I claim:

1. In a brake valve comprising in combination;
   a housing defining a bore closed at one end by an end-wall,
   a shaft slideably disposed through said end-wall having a first end for accepting an operator's force input and a second end in said bore,
   a moveable-wall which is moveable by said second end of said shaft including an annular piston slideably disposed in said bore and a reaction piston, said pistons defining between themselves a circumferential variable orifice adapted to narrow and thereby become restrictive in response to said force input,
   a collapsible chamber defined by said bore, by said end-wall and by said moveable-wall, said chamber having a fluid inlet including a check valve means and a pressure output port,
   and a flow passage through said brake valve starting at said inlet, passing into said chamber and exiting said chamber through said annular piston and said variable orifice,
   so that during power-on operation said force input causes the narrowing of said variable orifice and a restriction of flow through the flow passage which in turn generates pressure at the pressure output port, and during power-off operation said force input causes a closing of said variable orifice and a movement of said moveable-wall toward said end-wall thereby decreasing the volume of said chamber and manually pumping pressurized fluid through said output port.

2. In a brake valve as in claim 1 said shaft's second end slideably passing through said annular piston to attach to said reaction piston,
   wherein, during power-on operation said force input causes said reaction piston to move toward said annular piston and thereby cause said narrowing of said variable orifice, and during power-off operation said input force causes said reaction piston to abut against said annular piston and pull it in unison toward said end-wall while maintaining said variable orifice closed.

3. In a brake valve as in claim 2 spring means disposed between said reaction piston and said shaft's second end.

4. In a brake valve as in claim 2 dampening means disposed between said annular piston and said housing.

5. A brake valve for power assist or manual operation of a brake comprising in combination: housing means defining a pressure chamber having a fluid inlet including a check valve and a pressure output port, actuating means associated with said housing means for accepting an operator's force input, said housing means including a moveable wall which is moveable for collapsing said pressure chamber and a variable orifice bypassing said moveable wall, a flow passage through said brake valve starting at said inlet and passing into said chamber and exiting said chamber through said variable orifice, and means including a reaction piston connected with said actuating means and moveable relative to and engageable with said moveable wall for selectively restricting and closing said variable orifice and then shifting said moveable wall so that during power-on operation said force input causes restriction of said variable orifice and the flow through the flow passage which in turn increases pressure at the pressure output port, and during power-off operation said force input causes closing of said variable orifice and a movement of the moveable wall for collapsing said chamber and manually pumping said pressurized fluid through said output port.

6. A brake valve as defined in claim 5 wherein said actuating means comprise a shaft slidably extending through one end of the housing means opposite from said moveable wall and also through said moveable wall, said flow passage including a passageway through said moveable wall, and said reaction piston being connected with said shaft.

7. A brake valve as in claim 6 which includes spring means disposed between said reaction piston and said shaft for yieldably biasing said reaction piston upon actuation of said shaft.

* * * * *